United States Patent
Nonaka et al.

(10) Patent No.: US 8,976,270 B2
(45) Date of Patent: Mar. 10, 2015

(54) IMAGING DEVICE AND IMAGING DEVICE CONTROL METHOD CAPABLE OF TAKING PICTURES RAPIDLY WITH AN INTUITIVE OPERATION

(75) Inventors: Osamu Nonaka, Sagamihara (JP); Yuki Wani, Machida (JP)

(73) Assignee: Olympus Imaging Corp., Tokyo (JP)

( * ) Notice: Subject to any disclaimer, the term of this patent is extended or adjusted under 35 U.S.C. 154(b) by 941 days.

(21) Appl. No.: 12/687,004

(22) Filed: Jan. 13, 2010

(65) Prior Publication Data
US 2010/0208107 A1      Aug. 19, 2010

(30) Foreign Application Priority Data
Feb. 17, 2009    (JP) ................................ 2009-033649

(51) Int. Cl.
*H04N 5/262*    (2006.01)
*H04N 5/222*    (2006.01)
*H04N 5/228*    (2006.01)
*G06F 3/041*    (2006.01)
(Continued)

(52) U.S. Cl.
CPC .............. *H04N 5/232* (2013.01); *G06F 1/1626* (2013.01); *G06F 1/1643* (2013.01); *G06F 1/1684* (2013.01); *G06F 3/0488* (2013.01); *H04N 5/23216* (2013.01); *H04N 5/23293* (2013.01); *G06F 2200/1614* (2013.01)
USPC ............ 348/240.99; 348/333.01; 348/208.99; 345/173

(58) Field of Classification Search
CPC ......... H04N 1/3278; H04N 1/32789–1/32791; H04N 1/333; H04N 1/327; H04N 1/32384; H04N 1/33392; H04N 1/00411; H04N 1/40093; H04N 5/222; H04N 5/232; H04N 5/23216; H04N 2005/443
USPC ............................... 348/333.01–333.13, 239, 348/240.99–240.3, 222.1, 345–357, 348/208.99–208.16; 345/173–184
See application file for complete search history.

(56) References Cited

U.S. PATENT DOCUMENTS 6,148,149 A *  11/2000  Kagle ............................ 396/50
6,377,302 B1 *  4/2002  Ozaki et al. ............. 348/231.99

(Continued)

FOREIGN PATENT DOCUMENTS

JP    2005-236883    9/2005
JP    2007-036492    2/2007

OTHER PUBLICATIONS

First Office Action for Chinese Patent Application No. 201010109471.8, mailed Oct. 8, 2011 (4 pgs.) with translation (4 pgs.).

*Primary Examiner* — Pritham Prabhakher
(74) *Attorney, Agent, or Firm* — John C. Pokotylo; Straub & Pokotylo

(57) ABSTRACT

An imaging device and a control method for an imaging device of the present invention comprise an imaging section for photoelectrically converting a subject image and outputting image data, and a display section for performing live view display of the subject image based on the image data, wherein, with respect to whether or not a main body is being held, by determining if the main body is in a portrait orientation, and is being held by a touch surface area or with both hands, if this determination is that the main body is not being held a shooting command is received using only a release button, while if it is determined that the main body is being held a shooting command is received by touching the display section.

8 Claims, 17 Drawing Sheets

(51) Int. Cl.
*H04N 5/232* (2006.01)
*G06F 1/16* (2006.01)
*G06F 3/0488* (2013.01)

(56) References Cited

U.S. PATENT DOCUMENTS

| | | | | |
|---|---|---|---|---|
| 6,919,927 | B1* | 7/2005 | Hyodo | 348/333.02 |
| 7,034,881 | B1* | 4/2006 | Hyodo et al. | 348/333.12 |
| 7,375,755 | B2* | 5/2008 | Oya et al. | 348/333.02 |
| 7,706,681 | B2* | 4/2010 | Misawa | 396/374 |
| 7,724,296 | B2* | 5/2010 | Lonn | 348/333.12 |
| 8,144,203 | B2* | 3/2012 | Washisu | 348/208.99 |
| 2003/0052985 | A1* | 3/2003 | Oya et al. | 348/333.02 |
| 2004/0189856 | A1* | 9/2004 | Tanaka | 348/345 |
| 2005/0156882 | A1* | 7/2005 | Manchester | 345/158 |
| 2006/0072028 | A1* | 4/2006 | Hong | 348/333.01 |
| 2006/0077266 | A1* | 4/2006 | Nurmi | 348/239 |
| 2006/0098090 | A1* | 5/2006 | Bernard et al. | 348/77 |
| 2006/0104523 | A1* | 5/2006 | Suzuki | 382/232 |
| 2006/0140621 | A1* | 6/2006 | Misawa | 396/374 |
| 2007/0040810 | A1* | 2/2007 | Dowe et al. | 345/173 |
| 2008/0062127 | A1* | 3/2008 | Brodersen et al. | 345/158 |
| 2008/0136924 | A1* | 6/2008 | Washisu | 348/208.2 |
| 2008/0239132 | A1* | 10/2008 | Kohama | 348/333.01 |
| 2009/0040289 | A1* | 2/2009 | Hetherington et al. | 348/14.12 |
| 2009/0115881 | A1* | 5/2009 | Joo et al. | 348/333.06 |
| 2009/0167918 | A1* | 7/2009 | Ueda et al. | 348/333.01 |

\* cited by examiner

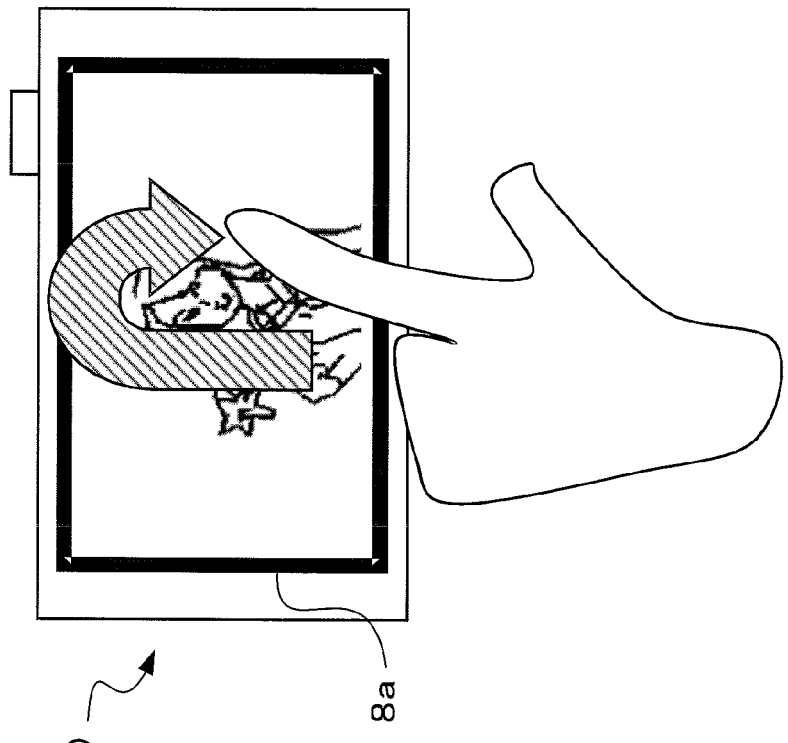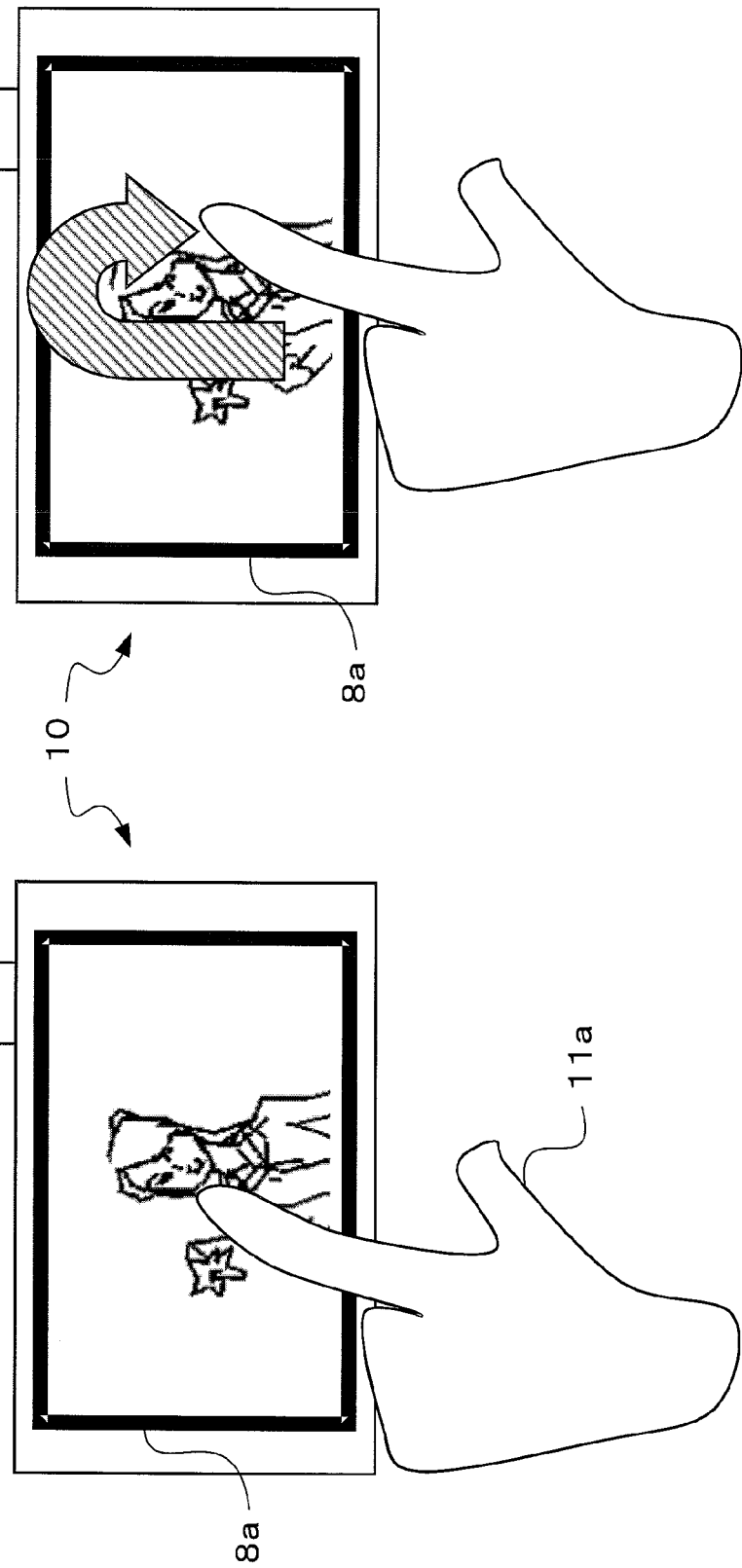

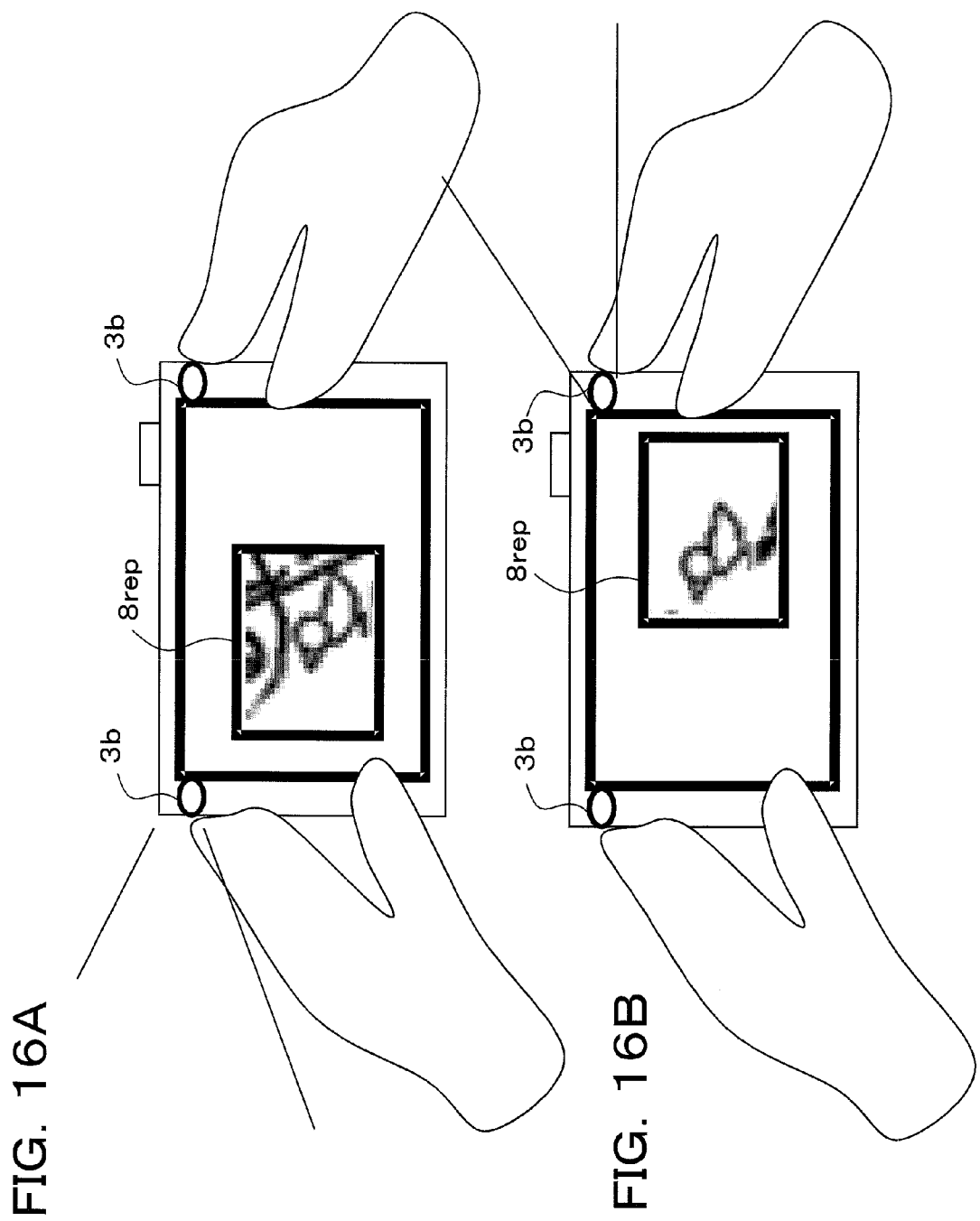

IMAGING DEVICE AND IMAGING DEVICE CONTROL METHOD CAPABLE OF TAKING PICTURES RAPIDLY WITH AN INTUITIVE OPERATION

Benefit is claimed, under 35 U.S.C. §119, to the filing date of prior Japanese Patent Application No. 2009-033649 filed on Feb. 17, 2009. These applications are expressly incorporated herein by reference. The scope of the present invention is not limited to any requirements of the specific embodiments described in the applications.

BACKGROUND OF THE INVENTION

1. Field of the Invention

The present invention relates to an imaging device, and to a control method for an imaging device.

2. Description of the Related Art

In recent years imaging devices such as digital cameras have come into widespread use, and it is possible to take advantage of various types of shooting, such as still image mode for taking still photographs, and movie mode for taking a series of still images and enjoying them as a movie. It is also possible to perform zoom operations by removing part of a screen to perform trimming. This type of digital zoom, or trimming shooting, has become widely adopted because the number of pixels on an image sensor has increased, and therefore an image can withstand such cropping.

Also, commands such as various mode settings for the camera have conventionally been carried out by operating a release switch etc., but more recently this is being done using a touch panel or the like. For example, Japanese Patent Publication No. 2007-036492 (laid-open Feb. 8, 2007, and hereafter referred to as patent document 1) discloses a digital camera having a monitor comprised of an EL display and a switch substrate, and in which switch operations are performed by pressing the surface of the EL display.

SUMMARY OF THE INVENTION

The present invention has as its object to provide an imaging device capable of changing shooting modes and taking pictures, at the time of shooting, rapidly and with an intuitive operation, and a control method for the imaging device.

An imaging device of the present invention comprises an imaging section for imaging a subject to be photographed and outputting image data, a monitor section capable of monitoring a taken subject image based on the image data, a touch panel capable of detecting touched states of the monitor section, an orientation determination section for determining an orientation of the device, and a control section for performing shooting control based on a result of determination by the orientation determination section and touched states detected by the touch panel.

An imaging device of a second invention comprises an imaging section for carrying out photoelectric conversion of a subject image and outputting image data, a display section for performing live view display of a subject image based on the image data, a holding determination section for determining whether or not a main body is being held, and an imaging control section for, when it has been determined by the holding determination section that the main body is not being held, receiving shooting commands using only a release button, and when it has been determined by the holding determination section that the main body is being held, receiving a shooting command using operations to the display section.

A control method for a control unit of an imaging device of a third invention comprises the steps of imaging a subject to be photographed, outputting image data, displaying a taken subject image capable of being monitored based on the image data, detecting touched states for the subject image that has been displayed, determining an orientation of the device, and carrying out shooting control based on results of the orientation determination and detected touched states.

A control method for a control unit of an imaging device of a fourth invention comprises the steps of photoelectrically converting a subject image, outputting image data, performing live view display of a subject image based on the image data, determining whether or not a main body is being held, and, if it has been determined that the main body is not being held, receiving shooting commands using only a release button, and if it has been determined that the main body is being held receiving shooting commands using operations to the main body.

BRIEF DESCRIPTION OF THE DRAWINGS

FIG. 5A and FIG. 5B are drawings for explaining usage states of the digital camera of the first embodiment of the present invention, with FIG. 5A showing appearance of the digital camera being held single-handedly, and FIG. 5B showing a display state on a display section 8a.

FIG. 6A and FIG. 6B are drawings for explaining usage states of the digital camera of the first embodiment of the present invention, and show states when region designation is being carried out on parts of a screen.

FIG. 12B shows appearance of designating another section.

FIG. 16A and FIG. 16B are drawings for explaining operating states of a digital camera of a modified example of the first and second embodiments of the present invention, with FIG. 16A showing a playback state when a section at the left side has been designated, and FIG. 16B showing a playback state when a section at the right side has been designated.

DETAILED DESCRIPTION OF THE PREFERRED EMBODIMENTS

Figure 1:
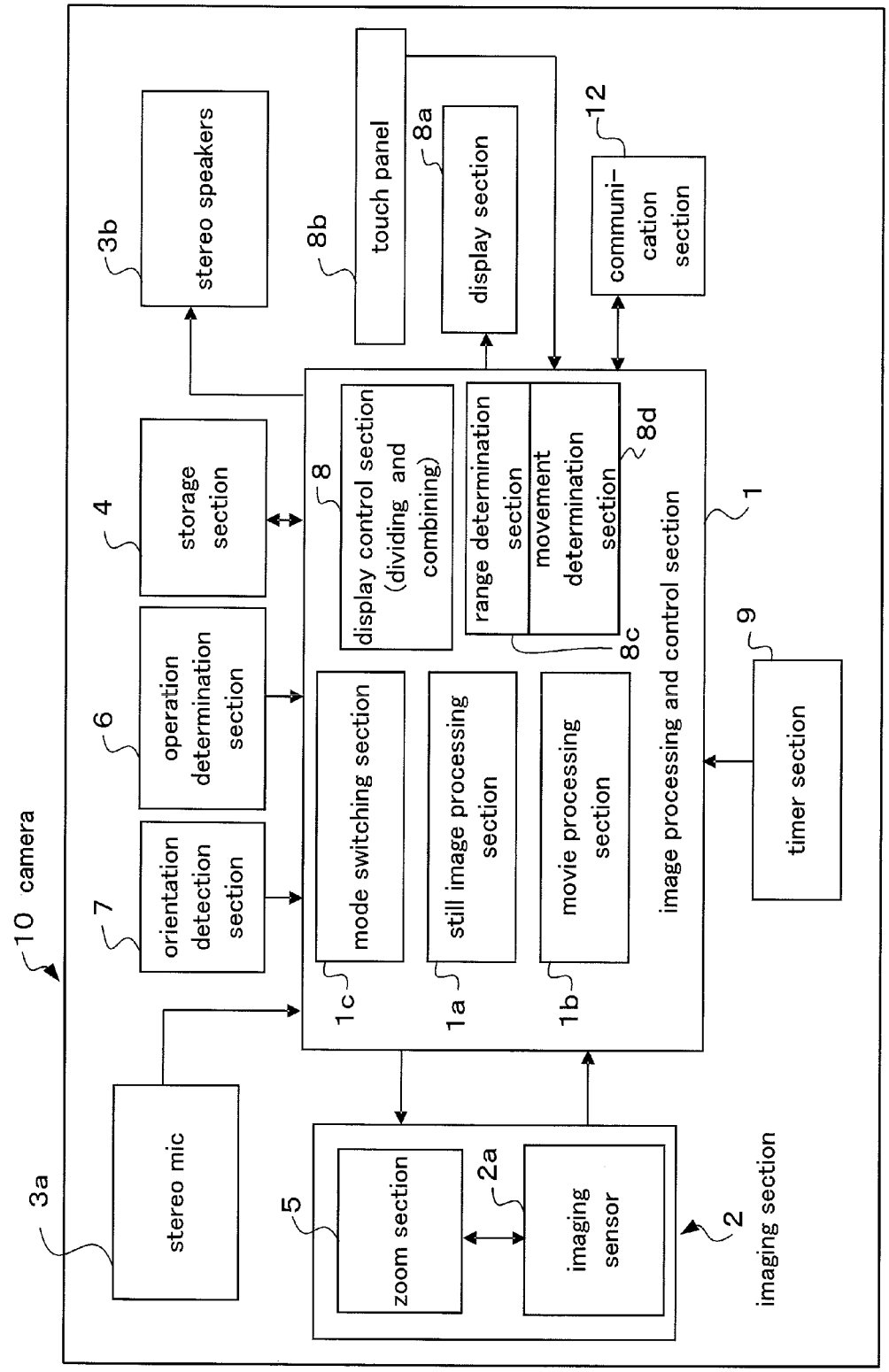
FIG. 1 is a block diagram showing electrical circuits of a digital camera of a first embodiment of the present invention.

Preferred embodiments using a digital camera to which the present invention has been applied will be described in the following in accordance with the drawings. FIG. 1 is a block diagram showing electrical circuits of a camera 10 of a first embodiment of the present invention. The camera 10 is a digital camera, and comprises an image processing and control section 1, an imaging section 2, a stereo mic 3a, stereo speakers 3b, a storage section 4, an operation determination section 6, an orientation detection section 7, a display section 8a, a touch panel 8b, a timer section 9, and a communication section 12, etc.

The imaging section 2 includes an image sensor 2a and a zoom section 5. Although not shown in FIG. 1, the imaging section 2 also includes a photographing lens 2b (refer to FIG. 9A), an exposure control section such as a shutter, and driving and reading circuits for the image sensor 2a, etc. The imaging section 2 functions to convert a subject image formed by the photographing lens 2b to image data, using the image sensor 2a. It is possible for the zoom section 5 to be an optical system using a zoom lens, but in this case zooming drive takes time, and it is only possible to enlarge along the optical axis. With this embodiment therefore, in addition to an optical system an electronic zoom that extracts only some signals from image signals of the image sensor 2a (to perform trimming) is used. Accordingly, the electronic zoom has a function to control an angle of view of the photographing lens itself by extracting one part from within image signals of the image sensor 2a, and to extract a section selected by user operation.

The image processing and control section 1 controls all sequences of the camera 10, in accordance with stored programs. Also, image signals output from the imaging section 2 are taken in, various image processing such as thinning processing, edge enhancement, color correction, image compression, movie processing, contrast adjustment, white balance etc. is carried out, and image processing such as live view display, storage to the storage section 4, playback display etc. is carried out. A still image processing section 1a, movie processing section 1b, mode switching section 1c, display control section 8, range determination section 8c, and movement determination section 8d are included within the image processing and control section 1.

The still image processing section 1a receives image signals from the imaging section 2, and performs image processing such as adjustment of exposure and contrast, and image compression. Also, the movie processing section 1b receives movie signals from the imaging section 2, and carries out image processing for movie recording, such interframe compression for a movie. The mode switching section 1c carries out shooting mode switching, such as still image shooting, movie shooting, zoom shooting (trimming) based on detection output from the touch panel 8b and orientation detection section 7, as will be described later.

The display control section 8 carries out live view display on the basis of image signals from the imaging section 2 when in shooting mode, and performs playback control for images that are stored in the storage section 4 when in playback mode. Display switching is also carried out in accordance with touch operation on the touch panel 8b. Also, when performing display, control such as screen division for dividing up the screen in order to carry out display of regions, where marks for a still image and a movie are composed on a shooting screen, or a shooting screen is restricted, is carried out. The range determination section 8c determines a range that has been touched by the touch panel 8b. The movement determination section 8d determines movement of touch by a finger etc. on the touch panel 8b. The previously described display control section 8 carries out switching of display screens and shooting modes based on determination results of the range determination section 8c and movement determination section 8d.

The stereo mic 3a acquires surrounding sounds, together with the storing of subject images at the time of shooting. The stereo speakers 3b are speakers for the playback of audio data that has been acquired by the stereo mic 3a and stored in the storage section 4. Using the stereo mic 3a and the stereo speakers 3b, it is possible to store and playback to that it is possible to identify in what direction a sound is from the screen.

The storage section 4 stores image data that has been acquired by the imaging section 2 when shooting is instructed by a release button or by touching, as will be described later, and that has been subjected to image processing by the image processing and control section 1. Also, when storing image data, it is associated with information such as the time and data the image was taken, and this associated information is recorded. As will be described later, in the case where a section is designated at the time of shooting, it is also possible to store the designated section.

The operation determination section 6 contains various operation members, such as a release button, power switch, playback mode setting button etc., and determines operating states of these operation members and sends determination results to the image processing and control section 1. The image processing and control section 1 carries out control for shooting and playback in a specified sequence, in accordance with the operating states of the operation members.

The orientation detection section 7 detects any inclination of the optical axis center of the shooting optical system constituting the imaging section 2. The orientation detection section 7 is constructed using an angular velocity sensor, angular acceleration sensor or gyro, for example, and can detect movement applied to the camera 10, and detect inclination of the main body from this movement. It is also possible to detect direct inclination using an inclination sensor. Detection output of the orientation detection section 7 is sent to the image processing and control section 1, and used at the time of mode switching. One example of the orientation detection section 7 will be described later using FIGS. 2A and 2B.

The display section 8a functions as a monitor section, and performs live view display before shooting and playback of stored taken images. The touch panel 8b is provided on a front surface of the display section 8a, and information such a locations touched by the photographer or the like is sent to the image processing and control section 1. Touch positions and touch inclination of the touch panel 8b are determined by the range determination section 8c and movement determination section 8d, as described previously. The structure of the touch panel 8b will be described later using FIG. 3. The timer section 9 has a calendar function and a clock function, and outputs shooting date and time information at the time of shooting, as previously described. The shooting date information can be used at the time of image management and image retrieval.

The communication section 12 transmits image data that has been converted to digital signals to external devices such as a television, personal computer etc. As a communication function, it is possible to have wired communication or wireless communication that uses infrared or radio.

Next, one example of the orientation detection section 7 will be described using FIGS. 2A and 2B. As described previously, there are various methods for detecting the orientation of the camera, such as, for example, a method using a gyro for hand shake detection, a method using angular velocity sensors for three axes, a method for determining the direction of gravity, and a method using a mercury switch. The example shown in FIGS. 2A and 2B has a permanent magnet that faces in the direction of gravity, and this permanent magnet is detected by a hall element. Specifically, a permanent magnet 7c is supported by support arms 7c, and the support arms rotate freely about an axis 7d. The permanent magnet 7b rotates around the axis 7d so as to face in the direction of gravitational force. A hall element 7a is arranged within a movement path of the permanent magnet 7b, and changes in the magnetic field of the permanent magnet 7b are detected by the hall element 7a.

Figure 2A:
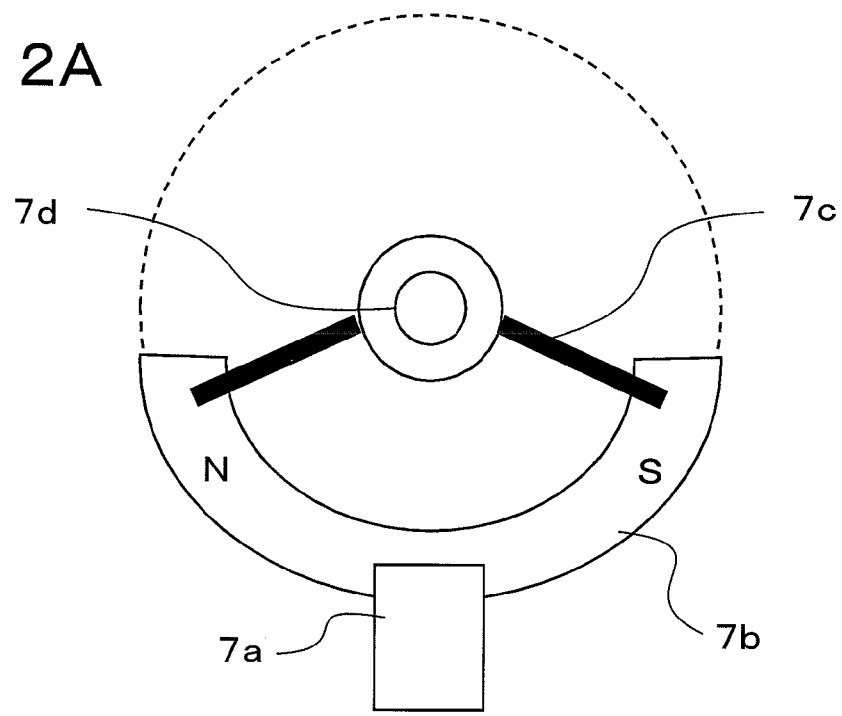
FIG. 2A and FIG. 2B are drawings showing an example of an orientation detection section 7 in the digital camera of the first embodiment of the present invention.
Figure 2B:
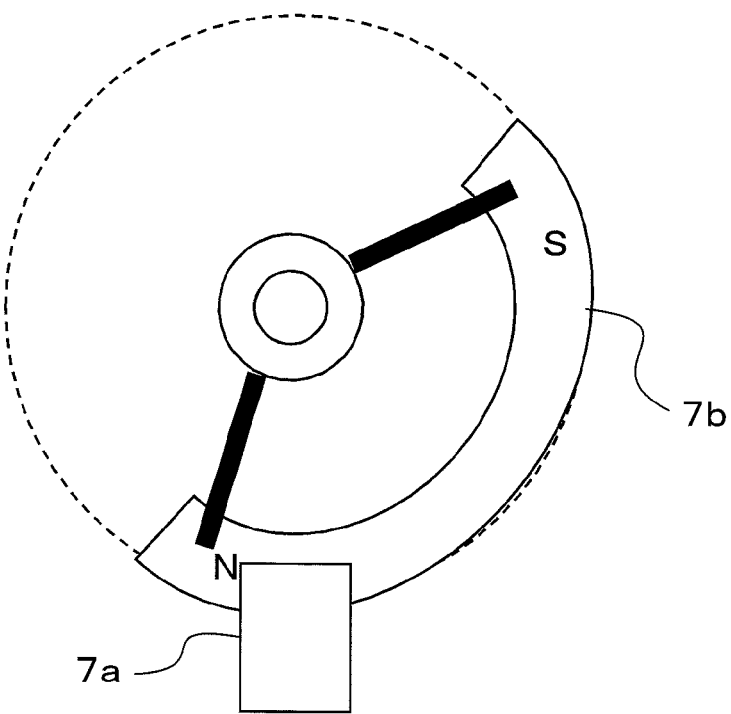

When the orientation of the camera 10 is horizontal, the permanent magnet 7b is positioned as shown in FIG. 2A, while if it is inclined the permanent magnet 7b is inclined as shown in FIG. 2B. By detecting the inclined state of the permanent magnet 7b using the hall element 7a, orientation of the camera 10 is detected, and it is possible to determine whether the camera 10 is in a landscape orientation or a portrait orientation.

Figure 3A:
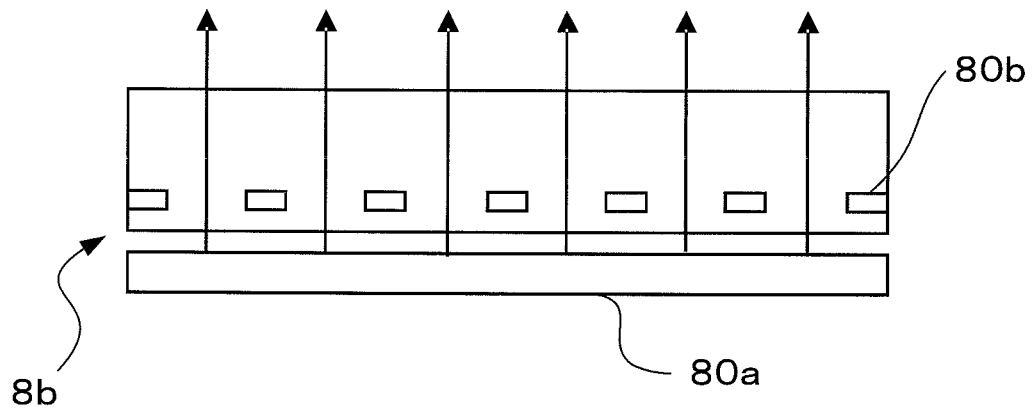
FIG. 3A and FIG. 3B are essential cross sectional drawings showing the structure of a touch sensor 8b in the digital camera of the first embodiment of the present invention.
Figure 3B:
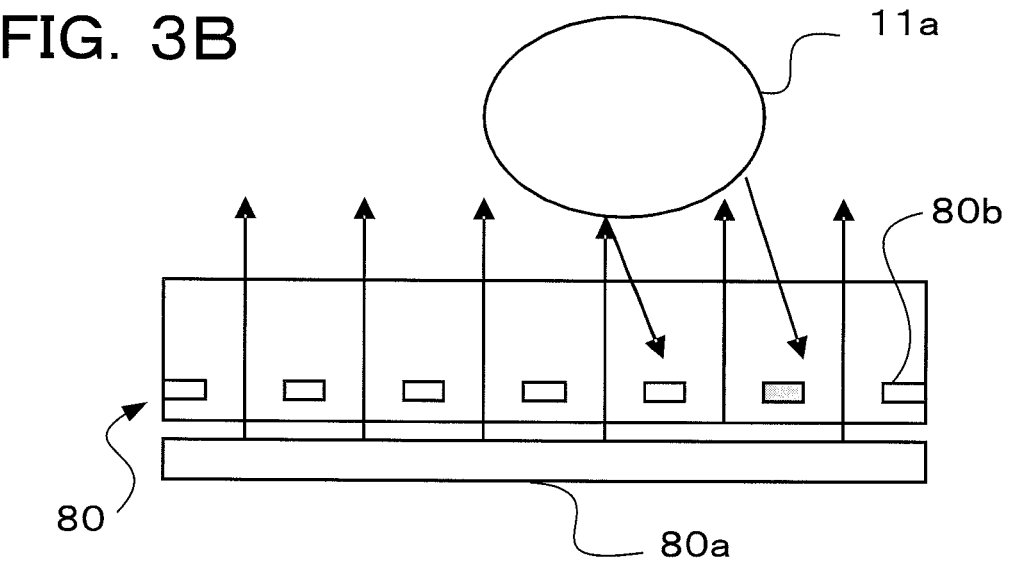

Next the structure of the touch panel 8b will be described using FIGS. 3A and 3B. FIG. 3A is a cross sectional drawing of the touch panel 8b, showing photoelectric sensors 80b arranged two-dimensionally on an upper side of a back light 80a. In the state of FIG. 3A, light that has been irradiated from the back light 80a advances forward and does not come back to the photoelectric sensors 80b, and so the photoelectric sensors 80b do not output a detection signal. If a finger 11a of the photographer is brought close to the touch panel 8b, or touches it, light from the back light 80a is returned back to photoelectric sensors 80b close to the finger 11a, and so the photoelectric sensors 80b output a detection signal. By detecting which of the photoelectric sensors 80b have an output signal, it is possible to determine the location that has been touched.

Figure 4:
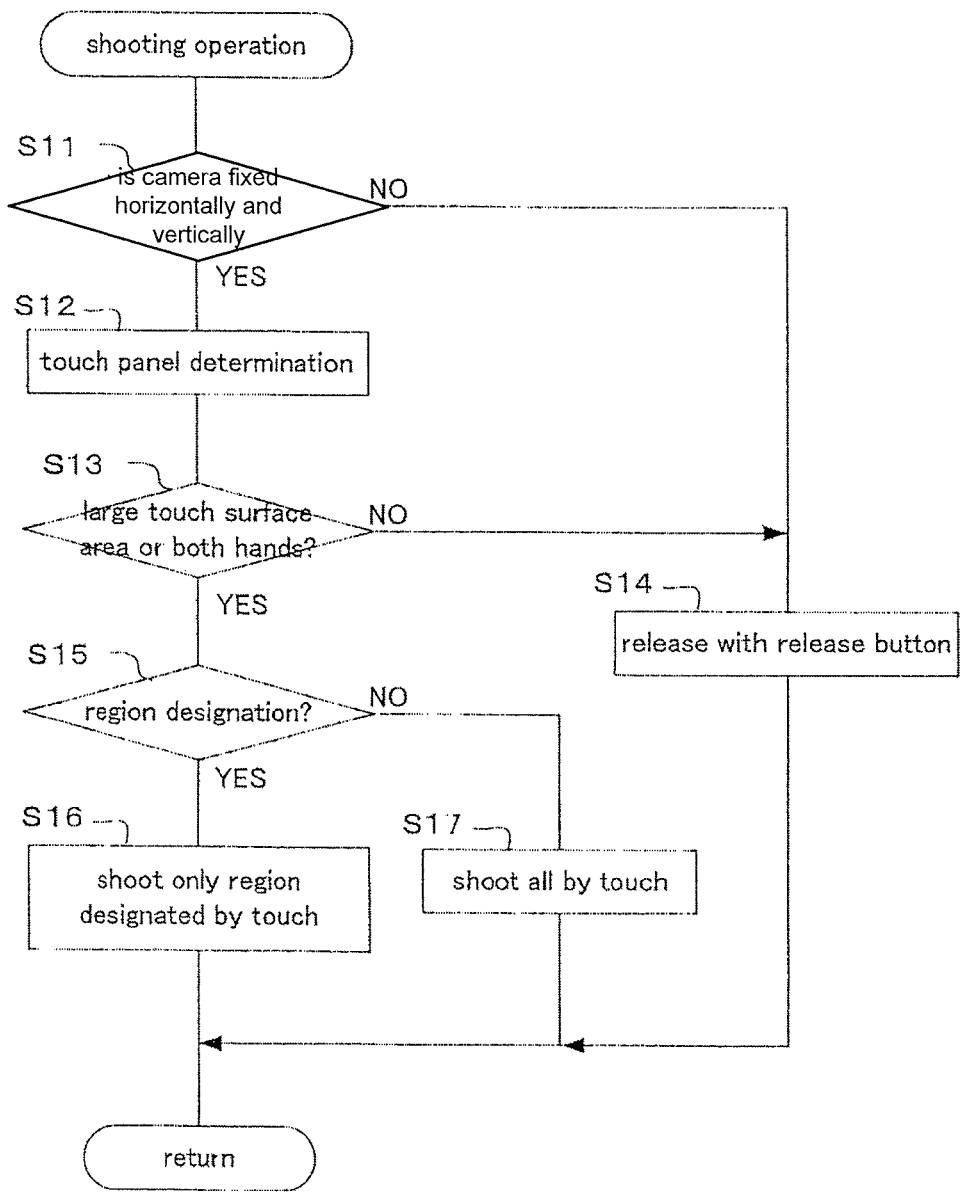
FIG. 4 is a flowchart showing a shooting operation of the digital camera of the first embodiment of the present invention.

Next, operation of this camera 10 will be described using the flowchart shown in FIG. 4. The shooting operation show in FIG. 4 has a processing flow that will be described focusing on the case where an exposure operation is carried out as a result of a release operation or equivalent operation, when operation of the camera 10 has been commenced. With this embodiment, in the case where the camera is held firmly and there is no danger of hand shake, release using operation of other than a release button is permitted, but if the camera is not being held firmly release is only permitted by use of the release button.

If the processing flow of the exposure operation is started, it is determined in steps S11 to S13 whether or not the camera 10 is being held firmly. It is first determined whether or not the camera is fixed horizontally and vertically (S11). This determination is judgment as to whether or not there is movement of the camera 10 or any handshake occurring, and it is determined that the camera is fixed if there is no vibration with no movement and no hand shake.

If the result of determination in step S11 is that the camera is horizontally and vertically fixed, touch panel determination is next carried out (S12), and it is determined if the touched surface area is large or if the camera is being held with both hands (S13). Here, the range determination section 8c determines if the display section 8a (touch panel 8b) on the rear surface of the camera 10 is being held in both hands, or is being held by a large surface area, based on signals from the touch panel 8b. In these cases it can be said that the photographer is holding the camera 10 firmly.

If the result of determination in step S13 is that the camera is not being held by a large surface area or with both hands, or if the result of determination in step S11 is that the camera is not horizontally and vertically fixed, release using the release button is permitted (S14). Since it has been determined in Step S11 or S1 that the camera 10 is not being held firmly, only release using the release button is permitted. Release using the release button is so that it is possible to perform a stable release operation.

If the result of determination in step S13 is that the camera is being held by a large touch surface area or with both hands, and if the result of determination in Step S11 is that the camera 10 is being held firmly, other release in addition to the release button is permitted. As other methods of release, in this embodiment it is possible to take advantage of various modes of shooting, depending on the manner of touch performed using the touch panel 8b. Specifically, there is a case of shooting with a touched section cropped to a specified size, and another case where a complete exposure button is displayed and if this complete exposure button is touched, an entire scene is captured.

If the camera is being held by a large touch surface area or with both hands in step S13, it is determined whether or not there is region designation (S15). Here, it is determined if the photographer designates a part within a subject image that is being displayed by the display section 8a using their finger or the like, that is, if region designation has been performed. If the result of this determination is that there is no region designation, complete shooting is carried out by touching (S17). Here, a touch mark for release is displayed, and if this touch mark for release is touched shooting of the whole screen is carried out, and image data for the entire screen is stored in the storage section 4.

If the result of determination in S15 is that there is region designation, only the designated region that has been touched is shot (S16). Here, within the entire screen being displayed by the display section 8, image data is only stored in the storage section 4 for a region that has been touched. Since only image data for the region that has been touched is stored, this is effectively the same as carrying out a zoom operation to perform zoom shooting. Once step S16, S17 or S14 has been processed, a return is executed.

In the first embodiment of the present invention thus described, in the case where the camera is firmly fixed (Yes at Step S11 and Yes at step S13), it is possible to simultaneously switch between whole screen shooting and shooting with a zoom operation by touching on the touch panel 8b. If the camera is not firmly fixed, normal shooting using the release button is permitted.

Figure 5A:
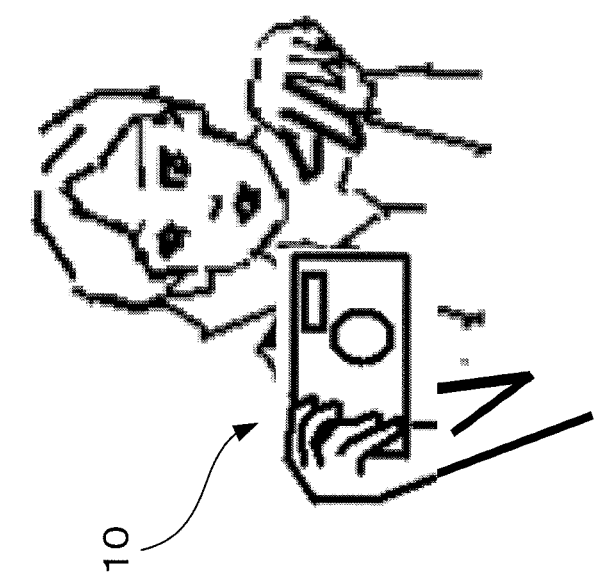

Next, a method of using the camera of the first embodiment of the present invention will be described using FIG. 5A to FIG. 7. FIG. 5A shows the appearance of a photographer holding a camera 10 firmly. When determining whether or not the photographer is firmly holding the camera 10, whether or not the camera 10 is being held in two hands is determined using the range determination section 8c, as described above. In the case where the camera is being held in one hand also, if it is determined by the range determination section 8c that the held section 8hd, as shown in FIG. 5B, is being touched, it is determined that the camera is being held firmly.

If it is determined in step S11 or S13 that the camera 10 is not being held firmly, it is only possible to perform release using the release button 6a. On the other hand, if it is determined that the camera 10 is being held firmly, and it is then determined in step S15 that region designation has not been performed, an ALL switch 8sw that acts as a release button is displayed on the display section 8a. If this ALL switch 8sw is touched, the range determination section 8c detects that the ALL switch 8sw has been touched based on signals from the touch panel 8b, and stores image data of the whole screen on the storage section 4.

Figure 7A:
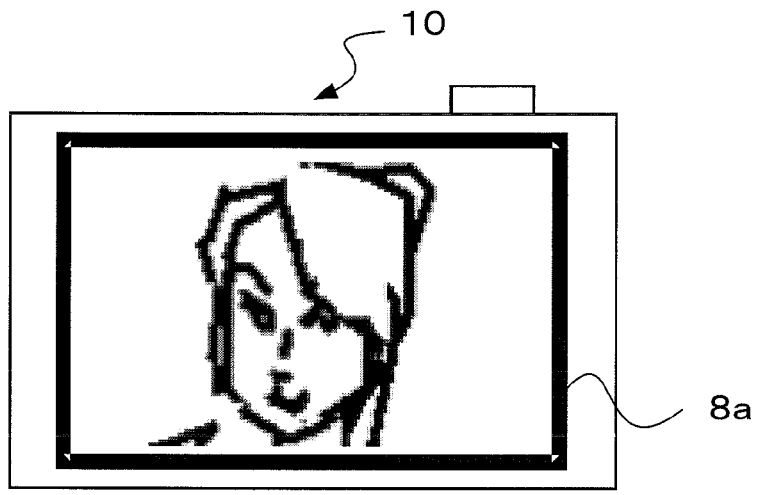
FIG. 7A, FIG. 7B and FIG. 7C are drawings for explaining operating states of a digital camera of a modified example of the first embodiment of the present inventions, with FIG. 7A showing appearance of displaying an image on the display section when zooming has been carried out, FIG. 7B showing a recorded still image, and FIG. 7C showing a state where shooting indications for a movie and a still image are displayed.
Figure 7B:
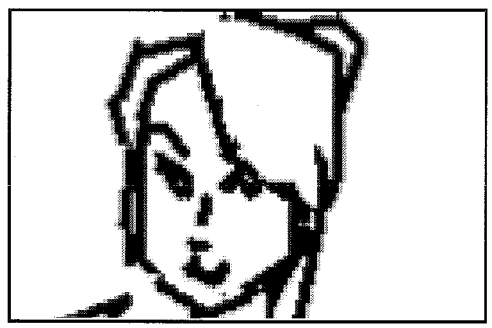

Determination that region designation has been carried out in step S15 results when, for example, after the photographer has touched the display section 8a with their finger 11a as shown in FIG. 6A, a region is traced over on the touch panel 8b as shown in FIG. 6B. In this way it is possible to specify what section from within the entire image is to be stored in the storage section 4. If zooming is carried out using the operations of FIG. 6A and FIG. 6B, then an image for the case where zooming is carried out is displayed on the display section 8a, as shown in FIG. 7A, and at the same time the image is stored in the storage section 4, as shown in FIG. 7B. With this embodiment, zooming display and shooting are carried out at the same time, but this is not limiting and it is goes without saying that it is also possible to perform only zooming display of a subject image using a zooming operation.

Figure 5B:
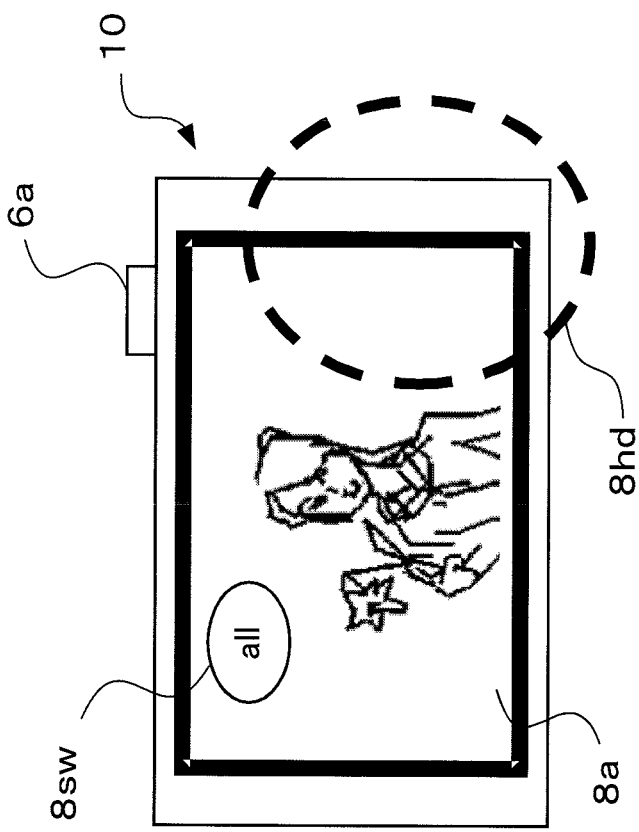
Figure 7C:
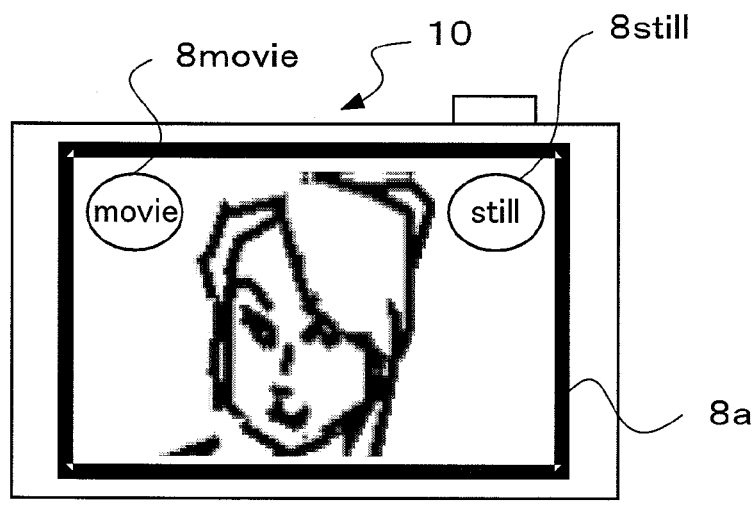
Figure 8:
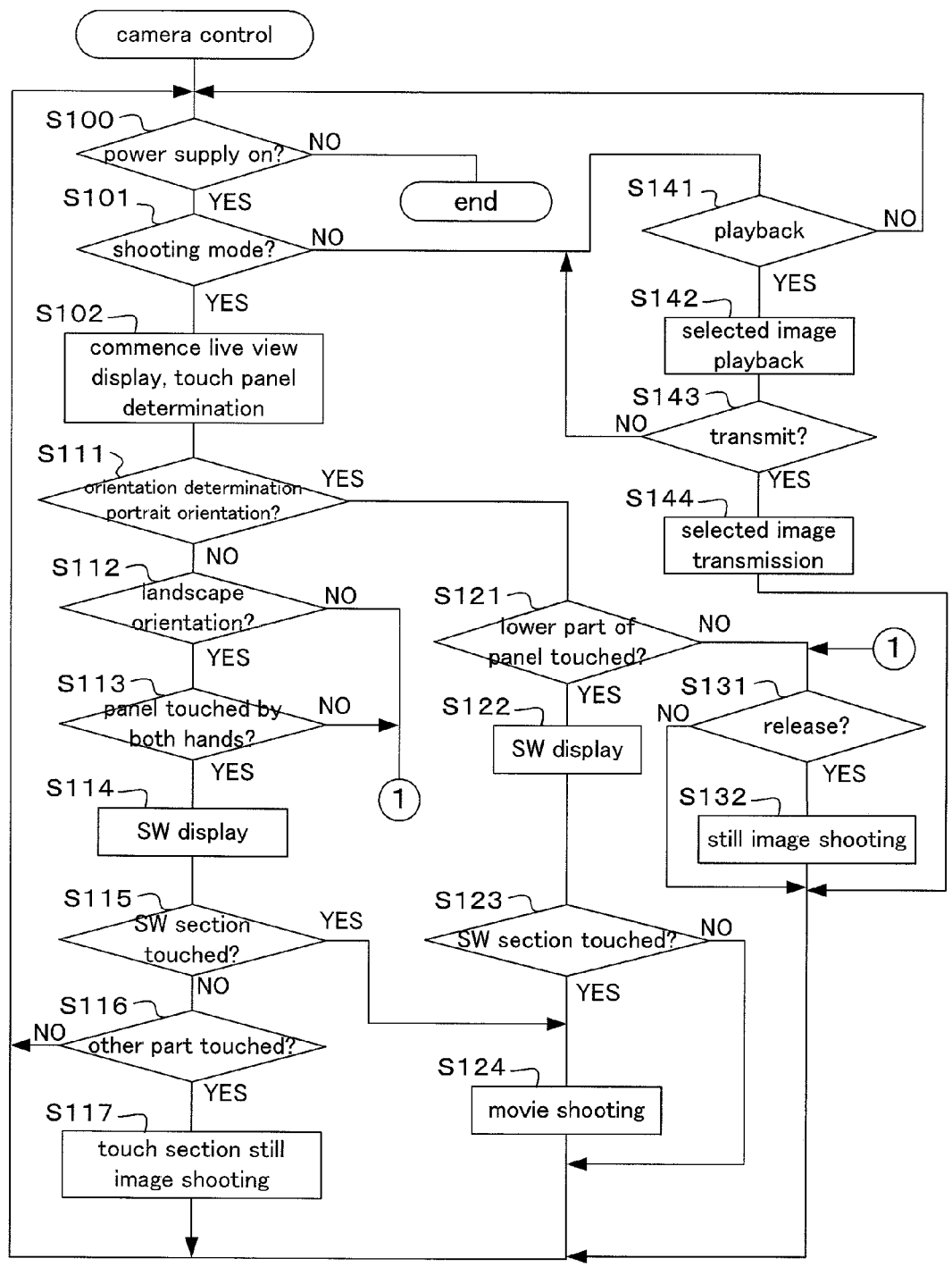
FIG. 8 is a flowchart showing camera control operations of the digital camera of a second embodiment of the present invention.

With this embodiment, if it is determined in step S15 that region designation has not been carried out, the ALL switch 8sw is displayed as shown in FIG. 5B. However, as a modified example, it is also possible to display a movie switch "8movie" and a still image switch "8still", as shown in FIG. 7C. In this case, it is possible to store a still image as shown in FIG. 7B if the still image switch "8still" is touched, while if the movie switch "8movie" is touched, start movie recording, and stop movie recording if the movie switch "8movie" is touched again.

In this manner, in the first embodiment and modified example of the present invention, it is determined whether or not the camera 10 is being held firmly, and control methods for release and zooming are switched in accordance with the result of this determination. If the camera is being held firmly, it is also possible to carry out control using means other than the release button, such as the touch panel 8b, while if the camera is not being held firmly it is only possible to perform shooting control using the release button. It is therefore possible to carry our mode switching and shooting at the time of taking a picture rapidly and with an intuitive operation.

A second embodiment of the present invention will now be described using FIG. 8 to FIG. 12. In the first embodiment, either carrying our release with the release button or allowing the use of release means other that the release button is switched depending on whether or not the camera is being held firmly. With the second embodiment, as well as the switching of the first embodiment it is possible to carry out switching between movie and still image etc. depending on whether or not the camera is being held firmly.

The structure of this embodiment is the same as the electrical circuitry shown in FIG. 1. Operation of the first embodiment was described using processing flow of a shooting operation, but for this embodiment operation will be described using processing flow representing operation of overall control of the camera, shown in FIG. 8.

If the processing flow for camera control is entered, it is first determined whether or not a power supply is on (S100). In this step determination of whether or not a power switch, which is an operation member, is on is performed by the operation determination section 6, and if the power switch is off the processing flow for camera control is terminated. Even if the processing flow for camera control is terminated, the state of the power switch is detected, and once the power switch becomes on operations from step S100 commence.

If the result of determination in step S100 is that the power switch is on, it is next determined whether or not the camera is in shooting mode (S101). If the result of this determination is that the camera is in shooting mode, then touch panel determination is carried out together with commencement of live view display (S102). Here, a subject image is subjected to live view display on the display section 8a at a frame rate of 30 frames per second, based on image data acquired by the imaging section 2. Based on the live view display the user can decide on which aspect to take the picture in, determine a photo opportunity and carry out the release operation. Touched states of the touch panel 8b are also determined by the range determination section 8c and the movement determination section 8d.

If commencement of live view display etc. is carried out, the orientation of the camera is next determined, and it is determined whether or not the camera is being held in a portrait aspect (S111). Here, it is determined by the orientation detection section 7 whether the camera 10 is being held in a portrait orientation. If the result of determination in step S111 is that the camera is not being held in a portrait orientation, it is next determined by the orientation detection section 7 whether or not it is being held in a landscape orientation (S112).

If the result of determination in step S112 is that the camera 10 is in a landscape orientation, it is next determined whether or not the two ends of the panel are being touched (S113). Here determination as to whether or not the two end sections of the touch panel 8b are being held is carried out by the range determination section 8c. If the result of determination in step S112 is that the camera is not in a landscape orientation, or if the determination in step S113 is that both ends of the panel are not being touched, there is a jump to step S131, which will be described later, and release using the release button is permitted. In this case, since either the camera is in an unstable orientation that is neither landscape or portrait, or if it is landscape the camera is not being held at both ends, it is being held unstably, and so release using the release button, that can carry out release in a stable manner, is permitted.

If the result of determination in Step 113 is that both ends of the panel are being touched, display of the switch section is next carried out (S114). Here, switch 8d is displayed on the display section 8a by the display control section 8 (refer to FIG. 19(*b*) and FIG. 11(*b*)). It is then determined whether or not this switch section 7d has been touched (S115). Here, whether or not the switch section 8d has been touched is determined by the range determination section 8c.

If the result of determination in S115 is that the switch section 8d has been touched, shooting of a movie is commenced (S124). Here image processing of the movie is carried out by the movie processing section 1b, and a movie stored in the storage section 4. Once movie shooting is commenced, processing returns to step S100. For playback after movie shooting, in the case of performing the switch display of step S114, a mark for movie termination is displayed on the switch section 8d, and if the switch section 8d is touched shooting termination for the movie shooting in step S124 is carried out.

If the result of determination in S115 is that the switch section 8d has not been touched, it is next determined whether or not another part has been touched (S116). Here, whether or not a section other than the switch section 8d has been touched is determined by the range determination section 8c. If the result of this determination is that there has been no touch, processing returns to step S100. On the other hand, if a section other than the switch section 8d has been touched, still image shooting of the touched section is carried out (S117). Here, similarly to the description using FIG. 6B, for the touched section a still image is taken by zooming, and stored. Once still image shooting is commenced, processing returns to step S100.

If the result of determination in step S111 is a portrait orientation, then it can be said that the camera is stable even if it is being held in one hand, as will be described later using FIG. 10A. In this case, it is then determined whether or not a lower part of the panel has been touched (S121). If the result of this determination is that the lower part of the panel has been touched, switch section display is carried out (S122). Here, display of the switch section 8d etc. shown in FIG. 10B, which will be described later, on the display section 8a is carried out by the display control section 8.

Next, it is determined whether or not this switch section 8d has been touched (S123). If the result of this determination is that the switch section 8d has been pressed, movie shooting is commenced (S124). On the other hand, if the result of determination in step S123 is that the switch section 8d has not been touched, or if movie shooting has commenced, processing returns to step S100).

If the result of determination in step S121 is that a lower part of the panel has not been touched, it is determined whether or not to carry out release (S131). Here, determination of whether or not the release button has been operated is carried out by the operation determination section 6. If the result of this determination is that the release button has been operated, still image shooting is carried out (S132). Here, image data of the entire screen is acquired from the imaging section 2 and stored in the storage section 4. If still image shooting is carried out, or if the result of determination in step S131 is that the release button has not been operated, processing returns to step S100.

If the result of determination in step S101 is not shooting mode, it is next determined whether or not the camera is in playback mode (S141). Here, determination of whether or not the playback button has been operated is carried out by the operation determination section 6. If the result of this determination is that it is not playback mode, processing returns to step S100.

On the other hand, if the result of determination in step S101 is playback mode, playback of a selected image is then carried out (S142). Here, an image taken immediately prior is played back on the display section 8a, and after that images designated by the photographer are played back. Next, it is determined whether or not to transmit data (143). In the case of transmitting selected image data to a television or personal computer or the like, the user operates a transmit button, and in this step it is determined whether or not the transmit button has been operated.

If the result of determination in step S143 is that there is to be no transmission, processing returns to step S141. On the other hand, if the result of determination is transmission, image transmission for the selected image is carried out (S144). Here, image data of a selected image is transmitted via the communication section 12 to an external television or personal computer. Once transmission is complete, processing returns to step S100.

Figure 9A:
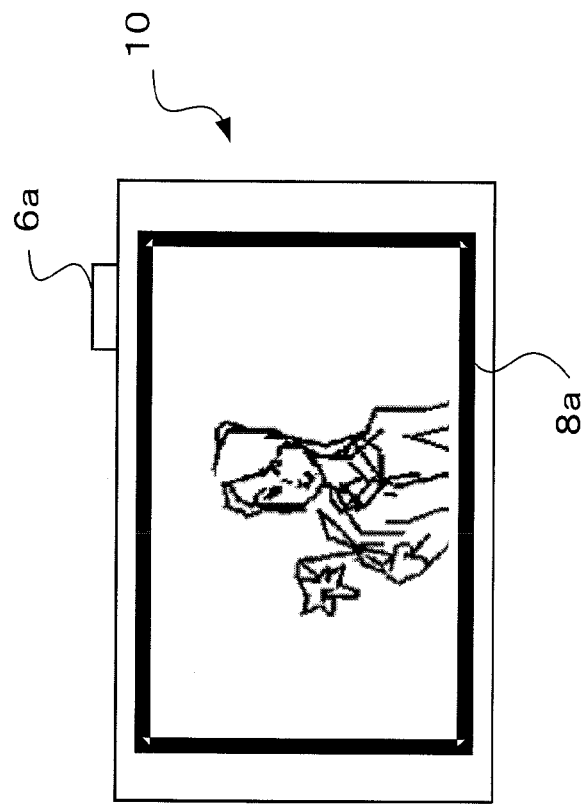
FIG. 9A and FIG. 9B are drawings for explaining operating states of a digital camera of a second embodiment of the present invention, with FIG. 9A showing appearance of the camera being held single handedly in a landscape orientation, and FIG. 9B showing a state of the camera at that time.
Figure 9B:

Next a usage method for the camera 10 executed by camera control will be described using FIG. 9A to FIG. 12B. FIG. 9A shows appearance of normal still image shooting carrying out an operation of the release button. In the processing flow of FIG. 8, this is either the case of step S111 Yes→S121 No→S131, the case of step S111 No→S112 No→S131, or the case of step S111 No→S112 Yes→S113 No→S131. In this case, if the release button 6a shown in FIG. 9B is operated, a still image is taken of the entire screen. There is a concept of giving priority to the release button 6a, facilitating shooting rapidly with even one hand, and a common-sense method of use, and so it is possible for even a user who has no desire for elaborate photography to easily take pictures.

Figure 10B:
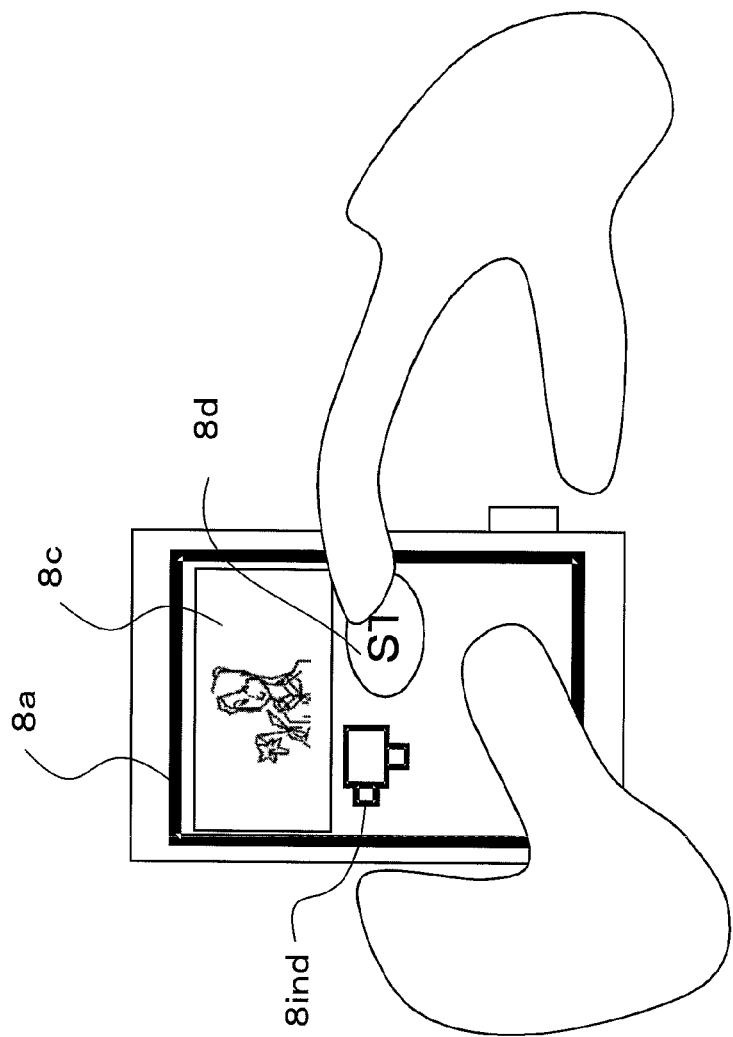
FIG. 10A and FIG. 10B are drawings for explaining operating states of a digital camera of a second embodiment of the present invention, with FIG. 10A showing appearance of the camera being held single handedly in a portrait orientation, and FIG. 10B showing a display state on a display section at that time.
Figure 10A:
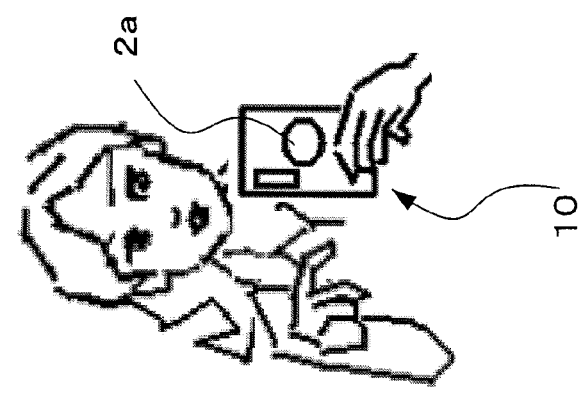

Next, FIG. 10A shows a case where a shooting operation is carried out using the right hand, with the camera being held in the left hand. In the processing flow of FIG. 8, this is the case of Step S111 Yes→S121 Yes→S122. With this example, holding the camera 10 in portrait orientation is a good way of achieving stability. By having the camera 10 in a portrait orientation, as shown in FIG. 10A, the direction of the camera's center of gravity and the direction of a hand receiving the camera are aligned, and so it is possible hold the camera firmly.

At the time of the switch display of step S122, as shown in FIG. 10B, "8ind" representing that there is movie shooting mode, and a switch part "8d" for instructing commencement of movie shooting (after movie shooting commences this will instruct stop), are displayed on the display section 8a beneath a subject screen 8c where the subject image is displayed as a landscape orientation image using live view display. By touching the switch section 8d in the state shown in FIG. 10B (S123 Yes), movie shooting is commenced, and shooting of the movie is terminated by touching again.

In the case of movie shooting, it is possible to use high vision image quality of 2M, and if it is a digital camera having a number of pixels greater than 10M it is possible to ensure sufficient image quality even with a landscape oriented image without using all of the pixels on the screen, with the camera in a portrait orientation. With the previous example shown in FIG. 5, the camera 10 was held in the right hand and a shooting operation was carried out using the left hand. There are also situations where shooting with the left hand is difficult, but with this example shown in FIG. 10A this point is addressed. In this embodiment, in the case of a portrait oriented picture, still image shooting involves issuing a shooting instruction using the release button, but at the time of switch display in step S122 it is possible to also display a still image switch, and when this still image switch is touched jump to step S132 to carry out the still image shooting.

Figure 11A:
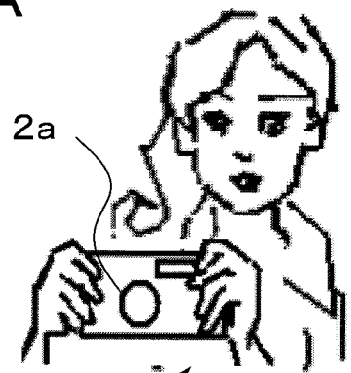
FIG. 11A to FIG. 11C are drawings for explaining operating states of the digital camera of the second embodiment of the present invention, with FIG. 11A showing appearance of the camera being held with both hands in a landscape orientation, FIG. 11B showing a display state on a display section at that time, and FIG. 11C showing a display state on the display section when a movie shooting operation has been launched.
Figure 11B:
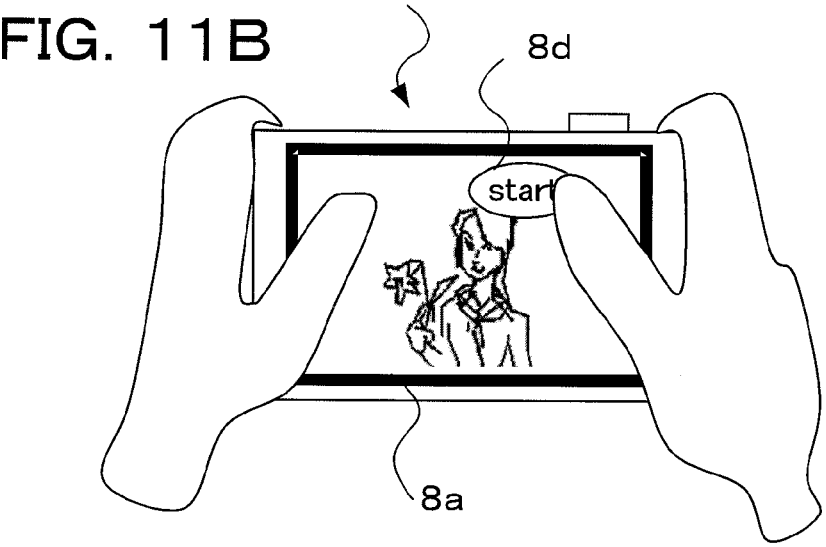
Figure 11C:
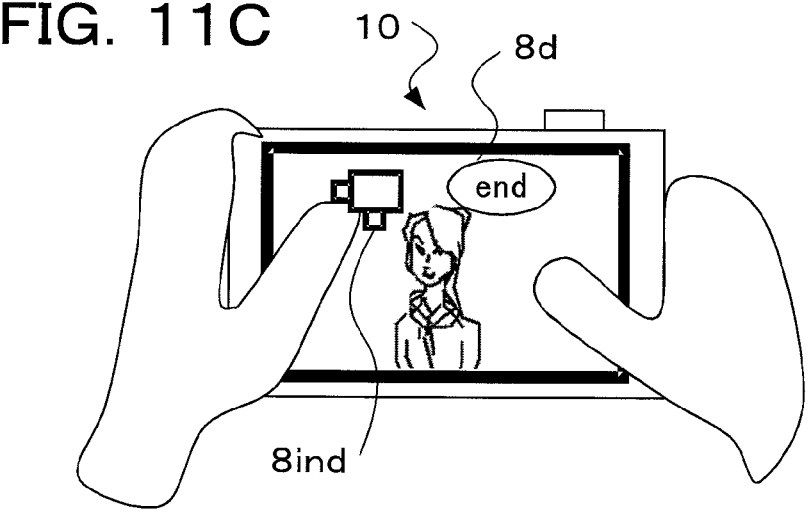

Next, FIG. 11A shows a case where the camera is being held firmly with both hands in a landscape orientation. This situation is the case of step S111 No→S112 Yes→S113 Yes→S114. In this case, as shown in FIG. 11A, the camera is in a landscape orientation, and since both ends of the display section 8a are being held it is in a state unlikely to be affected by hand shake. With the switch display of step S114, as shown in FIG. 11B, a switch 8d representing movie shooting start is displayed. If movie shooting is commenced, then a movie mark "8ind" representing that movie shooting is in progress is displayed on the display section 8a, as shown in FIG. 11C, and the switch section 8d is replaced with a mark representing stopping of the movie shooting. If the switch section 8d is touched in this state, movie shooting is terminated (movie termination processing at S115 Yes→S124).

In the case of being held firmly in a landscape orientation, it is possible to switch to movie in a split second simply by touching the switch section 8d, and movie shooting is also commenced simultaneously. The opportunity to take a movie is therefore not lost. With this embodiment, the fact that both ends of the display section 8a are being held is determined by the range determination section 8c based on output from the touch panel 8b, but this is not limiting and it is also possible to provide an optical sensor close to the display section 8a, for example, and detect whether or not a shadow of a finger is formed, and to determine whether or not the camera is being held in both hands from this.

Figure 12A:
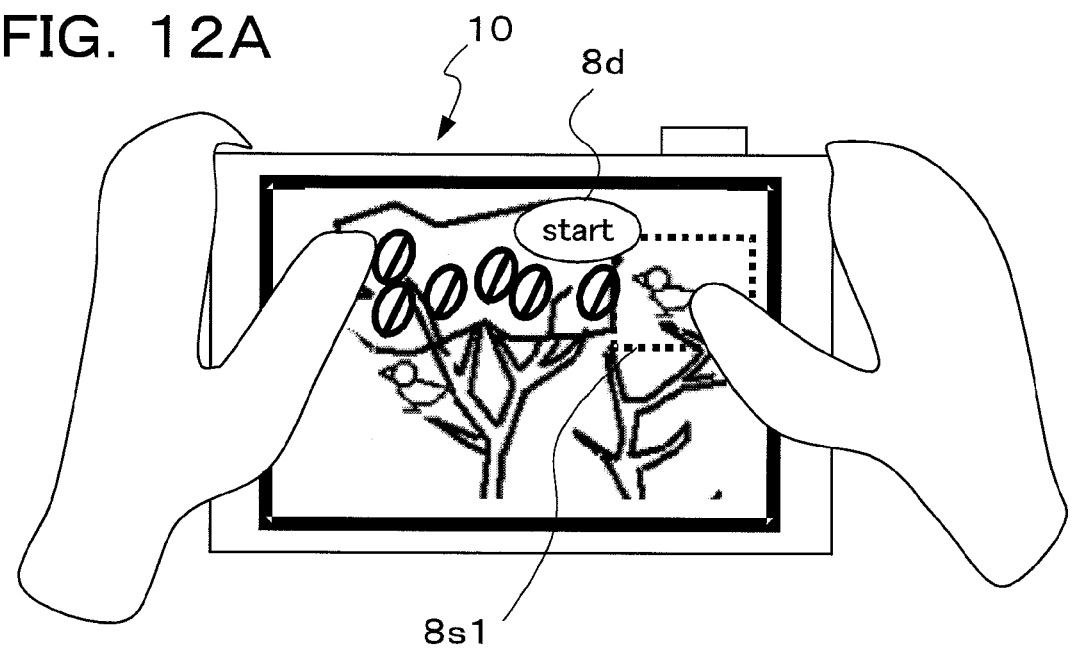
FIG. 12A and FIG. 12B are drawings for explaining operating states of the digital camera of the second embodiment of the present invention, with FIG. 12A showing the appearance of designating a section, in a state where the camera is being held in both hands in a landscape orientation.
Figure 12B:
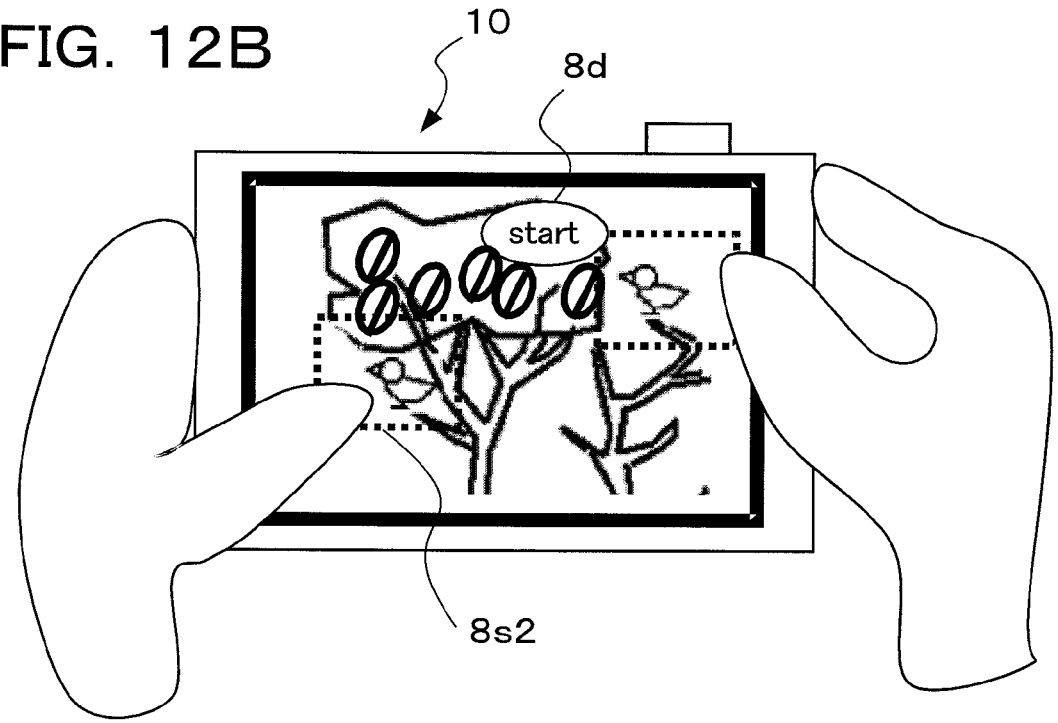

Next, FIG. 11A and FIG. 12B show a case where the camera 10 is being held firmly with both hands in a landscape orientation. This example differs from the case of FIG. 11A to FIG. 11C in that still image shooting is carried out by section designation by touching other than the switch section 85. This situation is the case of step S111 No→S112 Yes→S113 Yes→S114→S115 No→S116 Yes→S117. In this case, if a section other than the switch section 8d, for example the designation section 8s1, is touched with the right hand etc., as shown in FIG. 12A, a still image is taken of that section, and image data of that section is stored.

Also, if a designation section 8s2 as shown in FIG. 12B is touched with the thumb of the left hand, still image shooting of that section is performed, and image data of that section stored. Accordingly, within the whole scene, it is possible to shoot sections one after the other, and it is possible to carry out zooming for an arbitrary section the photographer wants and to keep repeatedly performing magnification. In the case of taking a picture of the small bird as shown in FIG. 12, it is difficult to search for the small bird with a narrow viewing angle, while with a wide viewing angle the small bird is small and unattractive. According to this embodiment the small bird is searched for at a wide viewing angle, and once it is found a magnified picture can be taken by quickly touching the section containing the small bird. It is therefore possible to take a picture of the small bird before it suddenly flies off. The section to be stored can also be a predetermined vicinity of a touched location, and it is possible to be a region that is traced as described in FIG. 6B.

As described above, with the second embodiment of the present invention shooting is performed with release button priority, but in a case where it has been determined that the camera is being held firmly in a portrait orientation, if the switch section 8d is touched there is an instantaneous switch from still image shooting to movie shooting, and shooting commences. Also, in a case where it has been determined that the camera is being held firmly with both hands in a landscape orientation, if the switch section 8d is touched there is an instantaneous switch from still image shooting to movie shooting, and shooting commences. Further, if a section other than the switch section 8d is touched in a case where it has been determined that the camera is being held firmly with both hands in a landscape orientation, shooting of that section is carried out. In this way, with this embodiment shooting mode and shooting operations are controlled in accordance with a held state of the camera, which means that at the time of shooting it is possible to carry out mode switching and shooting, both rapidly and with an intuitive operation.

Figure 13:
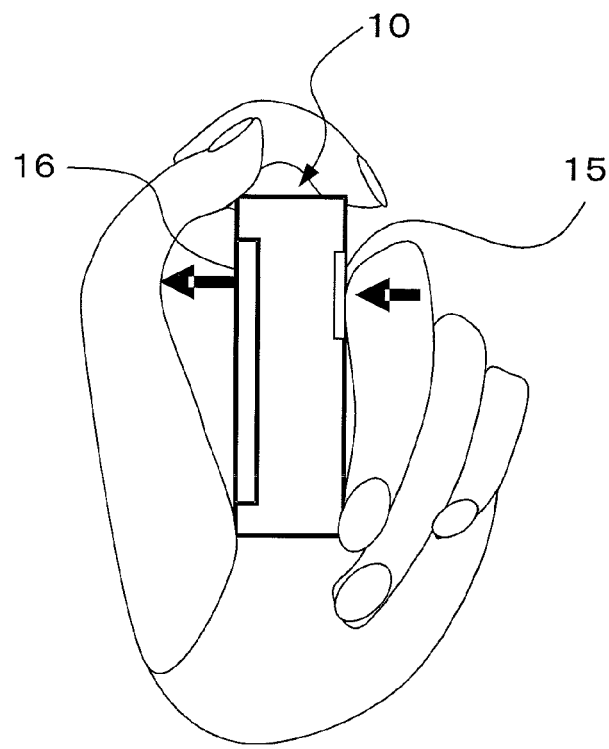
FIG. 13 shows another example of a detection section for detecting whether or not a camera is being held firmly, in a digital camera of a modified example of the second embodiment of the present invention.

Next, a modified example of the first and second embodiments of the present invention will be described using FIG. 13 to FIG. 18. FIG. 13 shows a modified example of the touch panel 8b. In the first and second embodiments the touch panel 8b was used in determining whether or not the camera 10 is being held firmly, but this is not limiting and it is also possible, for example, to use a pressure sensor 15 or a photoreflector 16. Specifically, it is possible to arrange a pressure sensor 15 in the camera 10, and to determine whether or not the camera 10 is being held firmly by detecting a holding force due to the photographer's hands. It is also possible to arrange a photoreflector 16 on the camera 10, and to determine whether or not the camera 10 is being held firmly by detecting reflected light from the photographer's hands.

Figure 14:
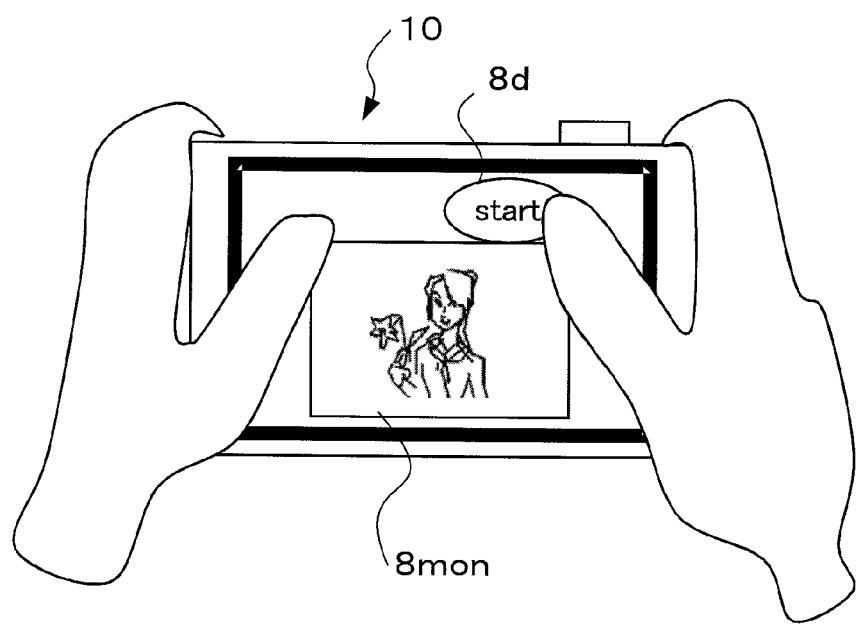
FIG. 14 is another example of display as a reduced image so that the subject image is not hidden by the hands or fingers, in a digital camera of a modified example of the first and second embodiments of the present invention.

The example in FIG. 14 performs display so that the display section 8a is not hidden by the photographer's hands when showing a subject image. Specifically, in the case where the photographer's hands have been detected by the touch panel 8b, a reduced subject screen 8mon, in which the subject image is reduced, is displayed at the time of live view display of the subject image. For example, it is possible, in step S102 of FIG. 8, to display the reduced subject screen 8mon in accordance with results of touch panel determination. It is also possible at this time for the switch section 8d to be displayed overlapping the reduced subject screen 8mon, making it possible to prevent photo opportunities being missed.

Figure 15A:
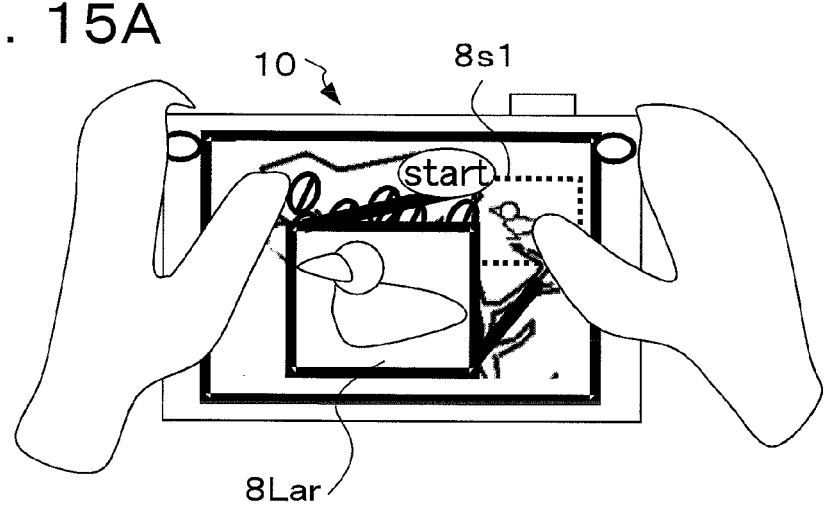
FIG. 15A, FIG. 15B and FIG. 15C are drawings for explaining operating states of the digital camera of the modified examples of the first and second embodiments of the present invention, with FIG. 15A showing appearance of an enlarged display when a section is designated, FIG. 15B showing appearance of a taken image displayed, and FIG. 15C showing appearance where there has been a change from shooting mode to playback mode
Figure 15B:
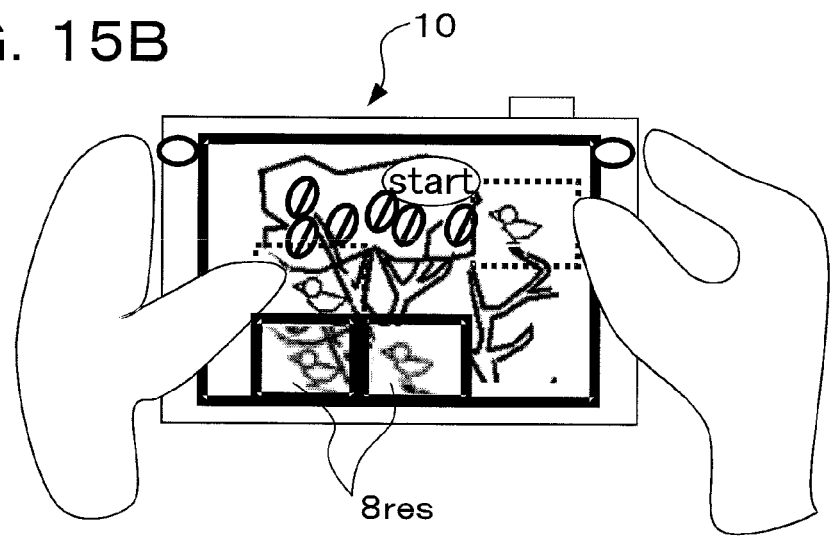

It is also possible to enlarge a taken image, or to display the taken image as a reduced image, as shown in FIGS. 15A and 15B. Specifically, in a case where designated sections 8s1 and 8s2 have been taken (refer to FIG. 1A and FIG. 12B), FIG. 15A shows appearance of the taken section being enlarged and displayed as enlarged image 8Lar. It is also possible, before shooting, to enlarge an image of designated section 8s1 and display enlarged image 8Lar. By performing enlarged display before shooting, it is possible to confirm detail of the image beforehand. Display of this enlarged image 8Lar can be carried out before performing the touch section still image shooting of step S117, or after shooting.

FIG. 15B shows appearance when, after shooting designated sections 8s1 and 8s2, shot images 8res taken up to that point are displayed as thumbnails overlapping the live view display. Display of these taken images 8res can be done by reading out image data from the storage section 4 after shooting, and performing display.

Operations up to now have been movies, still images and zooming switching, within the shooting modes, but it is also possible to switch between shooting mode and playback mode using a detection signal from the touch panel 8b. FIG.

Figure 15C:
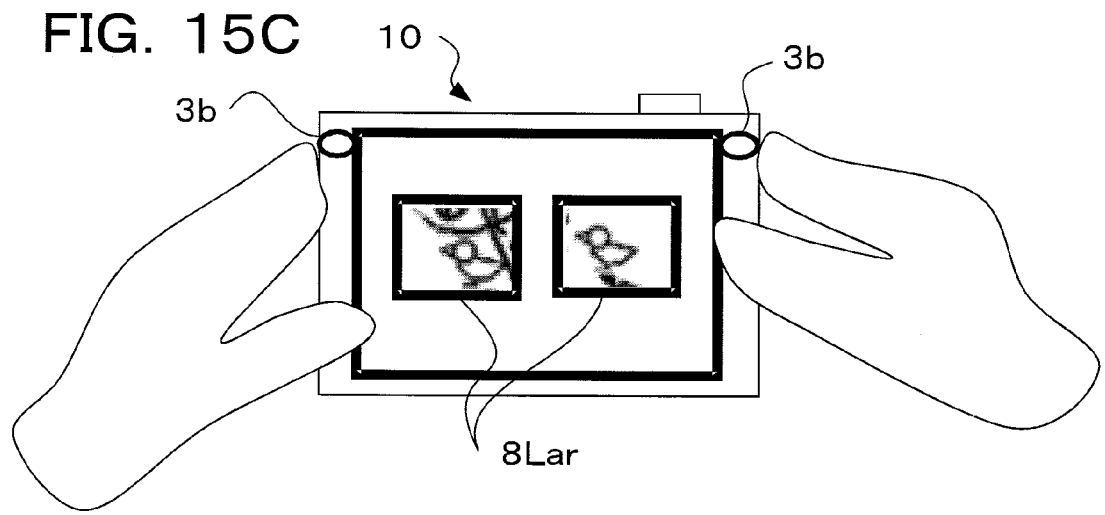

15C shows appearance when there is a switch from shooting mode to playback mode if it is detected that the photographers hand has been removed from the display screen 8a. Specifically, if the hand is removed, an image taken up to that point, for example, enlarged image 8Lar with the example of FIG. 15C, is displayed on the display section 8a. At this time, it is also possible to play back audio, that was recorded at the time of shooting, from the speakers 3b. This switching can be carried out by shifting to playback mode of step S142 and after in the case here it has been detected that there has been a change from a being touched state existing up to the present time to where there is no touch, when touch panel determination was carried out.

When performing playback, it is also possible to provide emphasis with stereo playback audio corresponding to the shooting location, as shown in FIG. 16A and FIG. 16B. Specifically, FIG. 16A is a situation where an image that has been taken from screen left is played back, and at this time, together with displaying playback image 8rep on the left side of the display screen 8a, recorded audio is played back from the speakers 3b so that it can be heard from the left side, as it would have been at the time of shooting. Also, FIG. 16B is a situation where an image that has been taken from screen right is played back, and at this time, together with displaying playback image 8rep on the right side of the display screen 8a, recorded audio is played back from the speakers 3b so that it can be heard from the right side, as it would have been at the time of shooting.

Figure 17:
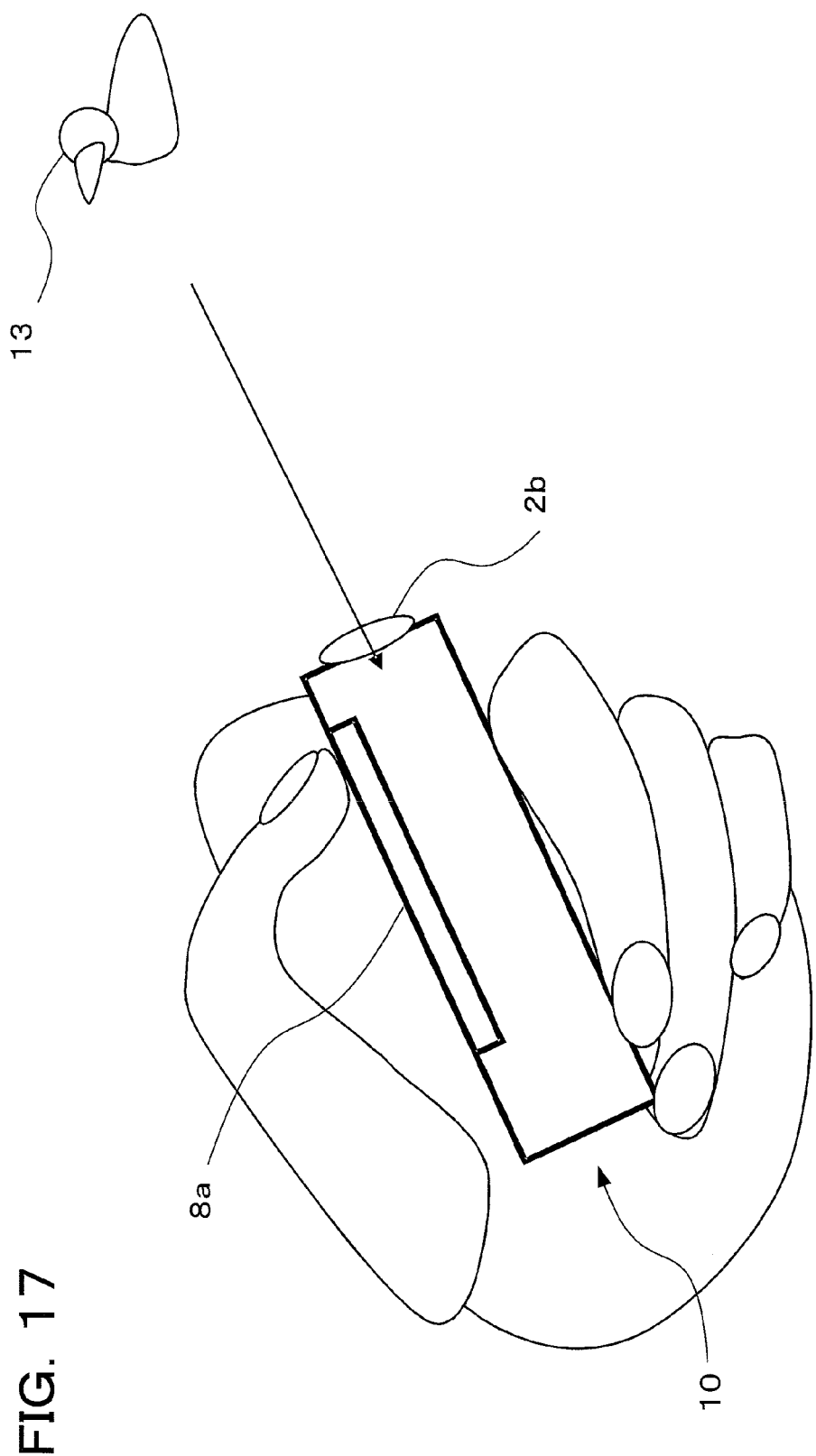
FIG. 17 shows a modified example of location of a photographing lens, in a digital camera of a modified example of the first and second embodiments of the present invention.
Figure 18:
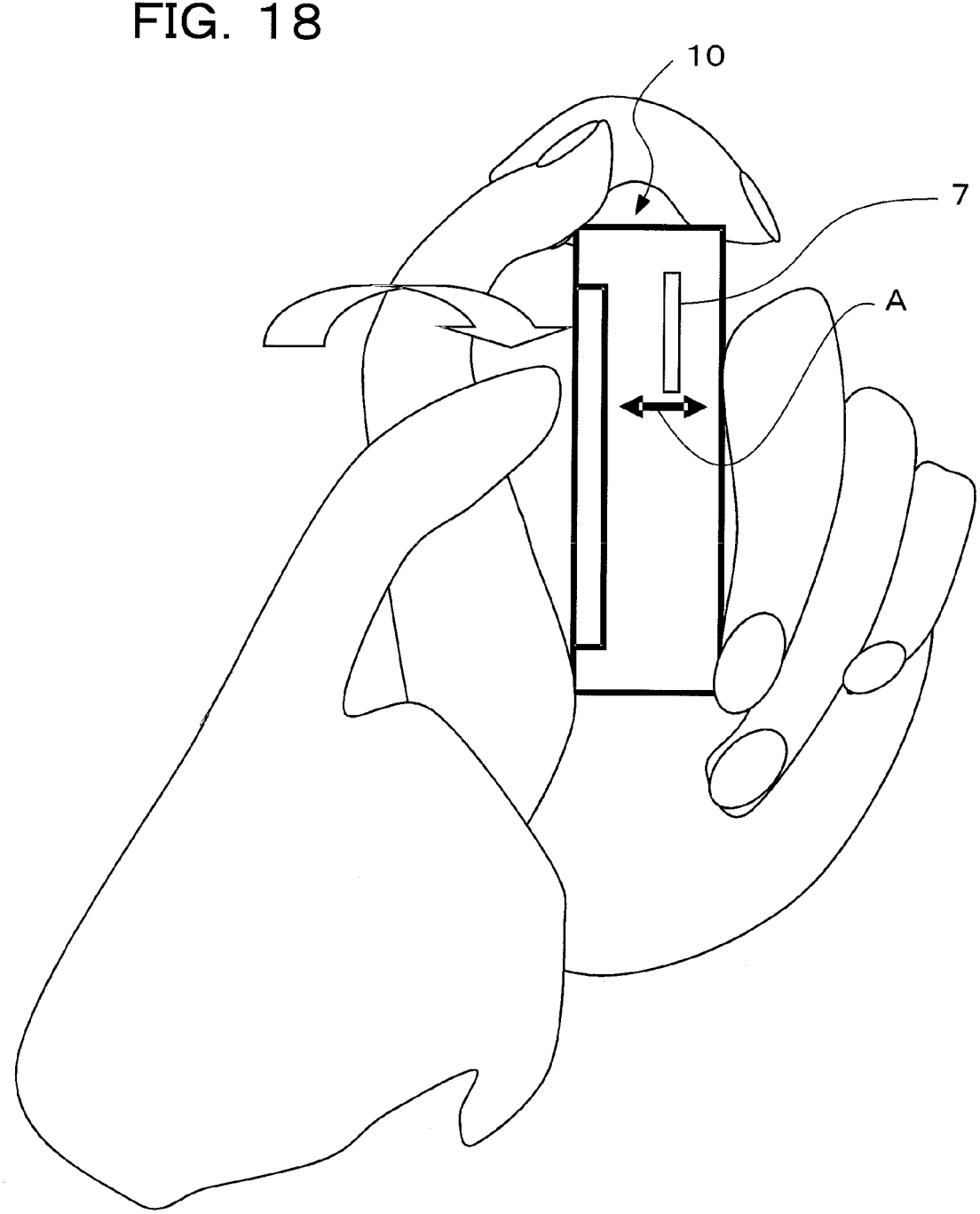
FIG. 18 is shows a modified example for detecting tapping instead of the touch panel, in a digital camera of a modified example of the first and second embodiments of the present invention.

Further, with each of the embodiments of the present invention the photographing lens 2b has been arranged on a surface at the opposite side to the display screen 8a, but this surface (the so-called front surface) is not limiting, and it is also possible as shown in FIG. 17, for example, to arrange the photographing lens 2b on a surface that is orthogonal to the display section 8. In this case, in a state where the photographing lens 2b is facing the subject 13, it is possible to hold the camera 10 firmly with one hand, and it is possible to position the display screen 8a where it is easy to see.

Further, with each of the embodiments of the present invention, at times such as starting or stopping still image shooting or movie shooting, the photographer touches the display screen 8a, and this is detected by the touch panel 8b. However, this is not limiting, and it is also possible, for example for the photographer to tap the camera 10, and to detect vibration A at this time. As means for detecting this tapping, it is possible to use an acceleration sensor of the orientation detection section 7 or the like.

As has been described above, with each embodiment of the present invention exposure control is carried out based on orientation detection results from the orientation detection section 7 and touched states detected by the touch panel 8b. Also, in the case where the camera is not being held firmly, shooting commands are received using the release buttons only, and when the camera is being held firmly shooting commands using other than the release button are received. It is therefore possible to carry out mode switching and shooting at the time of taking a picture, rapidly and with an intuitive operation.

Cameras generally invoke shooting by operation of a release button at the time of shooting, and for a long time is has been employed as a way of avoiding normal users causing handshake with the release operation. However, it is acknowledged that there are shooting operations that differ from this, such as cameras built in to mobile phones. If such shooting operations are adopted directly in a camera, there is a risk of handshake simply due to the format of the camera. With the embodiments of the present invention therefore, operation with the release button is only permitted when the camera is being held firmly and there is no danger of hand shake.

Also, with each of the embodiments of the present invention, switching of still image shooting mode, movie shooting mode, zoom shooting mode etc. can be carried out rapidly by touching the touch panel 8b etc. It is also possible to rapidly set a location for zooming (trimming) by tapping etc.

With each of the embodiments of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

The present invention is not limited to these embodiments, and structural elements may be modified in actual implementation within the scope of the gist of the embodiments. It is also possible to form various inventions by suitably combining the plurality structural elements disclosed in the above describe embodiments. For example, it is possible to omit some of the structural elements shown in the embodiments. It is also possible to suitably combine structural elements from different embodiments.

What is claimed is:

1. A control method for an imaging device, the control method comprising:

photoelectrically converting a subject image to generate image data;

performing, on a touch panel display of the imaging device, live view display of the subject image based on the image data;

determining, using hand shake status and range determination of a touched region of the touch panel display, whether or not a main body of the imaging device is being held firmly such that the imaging device is horizontally and vertically fixed without hand shake; and responsive to a determination that the main body of the imaging device is not being held firmly such that the imaging device is horizontally and vertically fixed without hand shake, permitting a shooting control only responsive to user operation of a release button, and otherwise, responsive to a determination that the main body of the imaging device is being held firmly such that the imaging device is horizontally and vertically fixed without hand shake, determining whether or not a region of the touch panel display has been designated via a user trace operation that corresponds to a touch by the user on the surface of the touch panel display, and responsive to a determination that a region of the touch panel display has not been designated via a user trace operation that corresponds to a touch by the user on the surface of the touch panel display, permitting a shooting control to capture an entire area of the live view display of the subject image via a further user touch operation on the touch panel display such that image data corresponding to the entire area of the live view display of the subject image is stored, and otherwise, responsive to a determination that a region of the touch panel display has been designated via a user trace operation that corresponds to a touch by the user on the surface of the touch panel display, permitting a shooting control to capture only the region of the touch panel display designated via the user trace operation such that only image data corresponding to the designated region is stored and a zoomed image of the designated region is displayed on the touch panel display.

2. The control method of claim 1, further comprising:
determining an orientation of the imaging device; and
switching a display image displayed on the touch panel display based on the determined orientation of the imaging device, and touched states detected by the touch panel display.

3. The control method of claim 1, wherein:
an act of determining an orientation includes detecting inclination from a horizontal state of an optical axis of a photographing optical system constituting the imaging device, and wherein the determination of an orientation is performed in accordance with inclination from a horizontal state detected.

4. The control method of claim 1, wherein:
responsive to a determination by the touch panel display that an upper part of the touch panel display has been designated, storing an image of the upper part as a taken image.

5. The control method of claim 1, further comprising:
displaying a mark for movie shooting and a mark for still image shooting on the touch panel display; and
performing shooting control in accordance with either of the marks being touched.

6. The control method of claim 1, further comprising:
responsive to a portrait orientation being determined, displaying a movie shooting mark, and commencing shooting of a movie responsive to a determination that the movie shooting mark is touched.

7. The control method of claim 6, further comprising:
responsive to the commencement of the shooting of a movie, displaying at least one of a mark indicating the movie shooting mode, and a mark indicating termination of movie shooting mode.

8. An imaging device comprising:
an imaging sensor configured to photoelectrically convert a subject image to generate image data;
a touch panel display configured to provide a live view display of the subject image based on the image data; and
a processor configured to
(1) determine, using hand shake status and range determination of a touched region of the touch panel display, whether or not a main body of the imaging device is being held firmly such that the imaging device is horizontally and vertically fixed without hand shake, and
(2) perform control of the imaging device, including responsive to a determination that a main body of the imaging device is not being held firmly such that the imaging device is horizontally and vertically fixed without hand shake, permitting a shooting control only responsive to user operation of a release button, and otherwise, responsive to a determination that the main body of the imaging device is being held firmly such that the imaging device is horizontally and vertically fixed without hand shake,
determining whether or not a region of the touch panel display has been designated via a user trace operation that corresponds to a touch by the user on the surface of the touch panel display, and
responsive to a determination that a region of the touch panel display has not been designated via a user trace operation that corresponds to a touch by the user on the surface of the touch panel display, permitting a shooting control to capture an entire area of the live view display of the subject image via a further user touch operation on the touch panel display such that image data corresponding to the entire area of the live view display of the subject image is stored, and otherwise, responsive to a determination that a region of the touch panel display has been designated via a user trace operation that corresponds to a touch by the user on the surface of the touch panel display, permitting a shooting control to capture only the region of the touch panel display designated via the user trace operation such that only image data corresponding to the designated region is stored and a zoomed image of the designated region is displayed on the touch panel display.

* * * * *